(12) United States Patent
Weidermann et al.

(10) Patent No.: US 11,424,669 B2
(45) Date of Patent: Aug. 23, 2022

(54) ROTOR WITH WINDING CARRIER AND COIL ELEMENT EMBEDDED THEREIN

(71) Applicant: Rolls-Royce Deutschland Ltd & Co KG, Blankenfelde-Mahlow (DE)

(72) Inventors: Christian Weidermann, Pößneck (DE); Johannes Richter, Fürth (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 16 days.

(21) Appl. No.: 16/981,327

(22) PCT Filed: Apr. 8, 2019

(86) PCT No.: PCT/EP2019/058753
§ 371 (c)(1),
(2) Date: Sep. 16, 2020

(87) PCT Pub. No.: WO2019/197307
PCT Pub. Date: Oct. 17, 2019

(65) Prior Publication Data
US 2021/0013791 A1    Jan. 14, 2021

(30) Foreign Application Priority Data
Apr. 10, 2018 (DE) .................. 10 2018 205 361.8

(51) Int. Cl.
*H02K 55/04* (2006.01)
(52) U.S. Cl.
CPC .................................. *H02K 55/04* (2013.01)
(58) Field of Classification Search
CPC ........ H02K 55/00; H02K 55/04; H02K 11/00; H02K 11/02; H02K 11/028; H02K 9/00;
(Continued)

(56) References Cited

U.S. PATENT DOCUMENTS

| 4,363,981 A | * | 12/1982 | Laskaris | .................. | H02K 3/46 310/52 |
| 2006/0008216 A1 | * | 1/2006 | Zamzow | .............. | H01R 35/025 385/114 |
| 2011/0285219 A1 | * | 11/2011 | Zhang | .................... | H02K 55/04 310/52 |

FOREIGN PATENT DOCUMENTS

| DE | 102011077457 A1 | 12/2012 |
| DE | 102016217734 A1 | 3/2018 |
| JP | S5941171 A | 3/1984 |

OTHER PUBLICATIONS

International Search Report and the Written Opinion for International Patent Application PCT/EP2019/058753 dated Jul. 8, 2019.
(Continued)

*Primary Examiner* — Tran N Nguyen
(74) *Attorney, Agent, or Firm* — Lempia Summerfield Katz LLC

(57) ABSTRACT

A rotor (1) for an electric machine (21) with a central rotor axis (A) is specified. The rotor comprises—at least one superconducting coil element (3) with a local winding axis (a), and—at least one winding carrier (5) into which the coil element (3) is embedded, —wherein a cohesive connection is formed between the winding carrier (5) and the coil element (3), —wherein the cohesive connection is provided on a connecting surface (11*c*) which forms only a first partial region of the entire contact surface (11*a*, 11*b*, 11*c*) between coil element (3) and winding carrier (5). Also specified are a machine with a rotor (1) of said type and a production method for a rotor (1) of said type.

17 Claims, 4 Drawing Sheets

(58) Field of Classification Search
CPC ............ H02K 9/19; H02K 9/197; H02K 9/20;
H02K 15/00; H02K 15/06; H02K 15/066;
H01F 41/00; H01F 41/12
See application file for complete search history.

(56) References Cited

OTHER PUBLICATIONS

German Search Report for German Application No. 10 2018 205 361.8 dated Nov. 10, 2020.

* cited by examiner

ROTOR WITH WINDING CARRIER AND COIL ELEMENT EMBEDDED THEREIN

This application is the National Stage of International Application No. PCT/EP2019/058753, filed Apr. 8, 2019, which claims the benefit of German Patent Application No. DE 10 2018 205 361.8, filed Apr. 10, 2018. The entire contents of these documents are hereby incorporated herein by reference.

BACKGROUND

The present embodiments relate to a rotor for an electric machine.

According to the prior art, the superconducting coil elements in the rotors of superconducting machines are typically held mechanically by a winding carrier. This may be either a radially inner winding carrier or a radially outer winding carrier. When using a radially inner winding carrier, the individual coils are often taped onto the winding carrier. In this process, a taping material (e.g., a glass fiber) is wound under pretension around the other components of the rotor and, in this way, fixes the individual coils under pressure on the winding carrier.

Such pretension may effectively reduce the risk of delamination within the superconducting coil element. Particularly, the windings consisting of superconducting strip conductors are very sensitive to such delamination damage. Delamination may occur either within the layer assembly of the strip conductor itself (e.g., between a superconducting layer and an adjacent metal layer), or delamination may occur between adjacent turns in the winding assembly. In other words, the winding assembly may split apart, where the adjacent turns, which are typically connected to one another by an impregnating agent, are separated from one another. It is also possible that both effects will occur simultaneously. In all these cases, the results of delamination may range from a reduction in the current carrying capacity of the superconducting coil to a complete loss of the superconducting properties. In general, therefore, it is desirable to reduce the risk of such delamination by precompression of the superconducting coils. This aspect is particularly important in the case of electric machines that rotate at very high speeds and/or in the case of machines with a very high rated power or a very high power density. With such machines, the mechanical loads on the superconducting coil elements due to centrifugal forces, electromagnetic forces, fluid pressures, and/or also thermal effects are particularly high. Usually, the resultant mechanical load on the superconducting winding and on the individual superconducting conductors is a result of a combination of several of the effects mentioned.

As described, for example, in DE102016217734A1, a radially outer winding carrier may be configured as an overall cylindrical hollow body and may have a plurality of recesses distributed over the circumference, into which the individual superconducting coil elements are then embedded radially from the inside. Such a configuration is associated with the advantage that an inner cavity is available for a fluid coolant, which may cool the embedded superconducting coil elements to a cryogenic operating temperature. An outer winding carrier of this kind, which is known from the prior art, may be formed from aluminum or from some other material with a high thermal coefficient of expansion, for example; this results in compression of the superconducting winding being achieved when the superconducting winding is cooled to a cryogenic operating temperature because the winding carrier shrinks onto the coil element during the cooling process. This results in a prestressed condition, in which predominantly compressive stresses act on the superconducting conductor. In general, these conductors are less sensitive to compressive stresses than to tensile stresses since tensile stresses may lead more easily to delamination of the superconducting material from an underlying carrier, and compressive stresses counteract delamination.

Despite the various measures known from the prior art, delamination within superconducting coil elements remains a major technical problem. This problem is particularly serious if electric machines with high speeds of rotation or for high power ranges are required since the forces acting on the coil elements are then particularly high.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a rotor for an electric machine that overcomes the disadvantages of the prior art is provided. For example, a rotor in which the risk of delamination within the coil element is reduced even further than in the prior art is provided. Thus, the rotor is to be particularly robust and, for example, robust enough for operation at very high speeds of rotation and/or in a very high power range. As another example, a machine with a rotor of this kind and a method for producing a rotor of this kind are provided.

The rotor according to the present embodiments is configured as a rotor for an electric machine. The rotor has a central rotor axis A, around which the rotor may be mounted (e.g., in a rotatable manner). The rotor includes at least one superconducting coil element with a local winding axis a. The rotor also includes at least one winding carrier, in which the coil element is embedded. In this arrangement, a materially bonded connection is formed between the winding carrier and the coil element, where the materially bonded connection is present on a connecting surface that forms only a partial region of the entire contact surface between the coil element and the winding carrier.

The at least one coil element is thus carried mechanically by the winding carrier. For this purpose, the coil element may be embedded into the winding carrier. This may be interpreted to be that there is contact with the winding carrier on more than one side of the coil element. In other words, the coil element may be in contact on at least two of its outer sides with the winding carrier. In one embodiment, the winding carrier supports the coil element from a side of the coil element that is radially on the outside in relation to the central rotor axis A. The described local winding axis a of the coil element may be a local axis of symmetry of the coil element, around which the coil element is wound. In the case of a plurality of coil elements, the position of this local winding axis a differs for each coil element. Typically, each such local winding axis a extends radially outward from the center of the rotor.

Using the materially bonded connection described, it is provided that the coil element is retained firmly in the winding carrier. This provides good force transmission between the coil element and the winding carrier, and unwanted disengagement of the contact between these two elements is prevented. The connecting surface described may be, for example, an adhesive bonding surface. In principle, however, other types of materially bonded connection are also possible (e.g., welding or soldering, such as with a plastic solder).

In the context of the present embodiments, the materially bonded connection is not formed in the region of the entire contact surface between the coil element and the winding carrier, but only in a partial region thereof (e.g., in a first partial region). The remaining region of the contact surface thus gives rise to a further, second partial region, in which there is no materially bonded connection and in which therefore the coil element and the winding carrier may in principle be movable relative to one another without the need to destroy a materially bonded connection for this relative movement. Through this possibility of non-destructive relative movement, the stresses that occur during the operation of the rotor may be at least partially compensated without destruction. One advantage of this non-destructive stress compensation is that delamination effects within the coil element may thereby be effectively avoided or at least reduced. With the rotor according to the present embodiments, therefore, there is a strong materially bonded connection, but there is also the possibility of stress compensation between the two connected elements in a different region of a common contact surface.

The electric machine according to the present embodiments has a rotor according to the present embodiments and a stator arranged in a fixed manner. The advantages of the machine according to the present embodiments are obtained in a manner similar to the advantages of the rotor according to the present embodiments, which have been described.

The method according to the present embodiments is used to produce a rotor according to the present embodiments. The method has at least the following acts: a) producing an inherently stable coil element as a pre-produced component; b) subsequently inserting the coil element into the winding carrier; and c) producing a materially bonded connection between the coil element and the winding carrier on a connecting surface, which forms only a first partial region of the contact surface between the coil element and the winding carrier.

By this method, a rotor according to the present embodiments with the advantages described above may be made available in a simple manner. For example, production is particularly simple by virtue of the fact that the production of the coil element in act a) is decoupled from act b), in which the coil element is combined with the winding carrier.

The embodiments of the rotor, the electric machine, and the production method that are described may in general be combined to advantage.

As an option, a sliding surface may be formed as a second partial region of the contact surface between the coil element and the winding carrier. Thus, this sliding surface may be formed by the region of the contact surface in which there is no materially bonded connection. A relative movement between the coil element and the winding carrier is possible within the sliding surface. As an option, there may be a nonpositive and/or a positive connection in the region of the sliding surface. In the region of the sliding surface, the coil element and the winding carrier may thus be in firm mechanical contact with one another, where sliding between the two elements is nevertheless made possible. This possibility of sliding may, in principle, either be realized in several directions parallel to the sliding plane or restricted to one spatial direction. A relative movement between the coil element and the winding carrier, however small the relative movement may be in some circumstances, is possible at least in one spatial direction without the need to separate a materially bonded connection for this purpose. In other words, sliding between the two elements described should be non-destructive. A sliding surface of this kind is an advantageous way of providing that mechanical stresses that occur during the operation of the rotor are reduced and the risk of delamination within the coil element is thus diminished.

In one embodiment, the sliding surface is formed at least partially by a surface that, overall, runs parallel to the local winding axis a of the coil element. The sliding surface may not be a level surface. For example, the sliding surface may also be a principal surface of the coil element running round in the form of a ring; overall, however, the surface may be aligned parallel to the winding axis a. In one embodiment, all contact surfaces aligned in this way contribute fully or at least almost fully to the sliding surface described. Here, "almost fully" may be that an edge region (e.g., a 10% edge region) of this contact surface extending parallel to the local winding axis a may nevertheless be adhesively bonded or connected in some other materially bonded way, for example.

An advantage of alignment of the sliding surface parallel to the local winding axis a may be that sliding parallel to this axis a is made possible. The mechanical stress that acts between adjacent turns of the winding element may thus be reduced. As a particular preference, the sliding surface is even fully provided by one or more partial surfaces extending parallel to the local winding axis a.

As a general preference, the superconducting coil element may have a continuous annular basic structure and a rectangular winding cross section, by which four encircling principal surfaces of the coil element are defined. The "embedding" described above may be that at least two of these encircling principal surfaces of the coil element are in mechanical contact with the winding carrier. For example, the contact surface may be formed by precisely two of these encircling principal surfaces or, alternatively, by precisely three of these encircling principal surfaces. In one embodiment, at least one coil element principal surface situated radially on the inside in relation to the central rotor axis A is not in contact with the winding carrier since direct impingement by a flow of a fluid coolant is then made possible on this exposed side. In principle, however, the possibility that the fourth principal surface of the coil element is also in contact with the winding carrier should not be excluded.

The sliding surface may be provided at least partially by a first coil surface, which is oriented radially inward in relation to the local winding axis a of the coil element. For example, this may be an encircling principal surface of the coil element that is situated radially on the inside in relation to a. As an alternative or in addition, the sliding surface may be provided at least partially by a second coil surface, which is oriented radially outward in relation to the local winding axis a of the coil element. For example, in this case too, this can be an encircling principal surface of the coil element which is situated radially on the outside in relation to a. Thus, the sliding surface may either be formed by one of the two principal surfaces described or, for example, may also be composed of a plurality of partial surfaces that do not have to adjoin one another and may include the two principal surfaces described. In either case, the two principal surfaces described are suitable as sliding surfaces since the two principal surfaces are both aligned parallel to the local winding axis a, at least in the presence of a cylindrical flat coil. Thus, an effective reduction in mechanical stresses (e.g., between the turns of the winding but also within the conductor from which the winding is formed) is achieved by sliding in the region of these surfaces.

In one embodiment, each of the principal surfaces described may contribute fully to the sliding surface. Thus, it is also possible, for example, for there to be a materially bonded connection between the coil element and the winding carrier in an edge region of the respective principal surface as well (e.g., in an edge region that adjoins the connecting surface).

The winding carrier may be coated with a lubricant in the region of the sliding surface. As an alternative or in addition, it is also possible for the coil element to be coated with a lubricant in the region of the sliding surface. In principle, such an antifriction layer may be present in a partial region; in one embodiment, however, the antifriction layer is present substantially over the entire sliding surface or at least over a predominant portion of the entire sliding surface. In one embodiment, the antifriction layer includes a fluoropolymer (e.g., polytetrafluoroethylene (Teflon)). It is a characteristic feature of such an antifriction layer that the coefficient of friction between the coil element and the winding carrier is lower with the coating than without this coating.

In one embodiment, a nonpositive contact may be formed between the coil element and the winding carrier in the region of the sliding surface. In other words, there may be a pressure connection between the coil element and the winding carrier, for example, in the region of the contact surface in which there is no connection by material bonding. This may be effected, for example, by shrinking the winding carrier thermally onto the coil element if the winding carrier surrounds the coil element radially (e.g., with respect to the local winding axis a and/or the central rotor axis A) and is subject to greater thermal shrinkage than the coil element when cooled from room temperature to an operating temperature of the superconductor.

In the case of nonpositive contact, there is generally a stronger mechanical connection between the coil element and the winding carrier than in the case of a loose mechanical contact. In this case, the static friction that is to be overcome for a sliding movement is dependent on the level of the applied force. In principle, however, a sliding movement to dissipate mechanical stresses and reduce the risk of delamination is fundamentally possible, even where there is nonpositive engagement. The advantage of a nonpositive connection is that the coil element may be held particularly firmly in the winding carrier without the need for a materially bonded connection over the entire region of the contact surface.

Alternatively or, for example, also in addition to the nonpositive connection, there may also be positive engagement between the coil element and the winding carrier. This may be accomplished merely by the presence in the winding carrier of a recess matching the basic shape of the coil element, into which the coil element may be embedded in the manner described. In addition, however, a further positive engagement (e.g., by interengaging longitudinal grooves that may be aligned along the local winding axis a) that allows a relative sliding movement between the coil element and the winding carrier only in a selected spatial direction (e.g., parallel to a) may also be created between the two elements.

The connecting surface between the coil element and the winding carrier (e.g., the surface on which there is a materially bonded connection) may include a third coil surface that is directed radially outward in relation to the central rotor axis A. As a particular preference, the connecting surface may be provided substantially exclusively by this coil element surface situated radially on the outside in relation to A. For example, this may be a radially outer principal surface of the coil element running round in the form of a ring. Through the formation of a materially bonded connection in this region (e.g., a connection that may not be released non-destructively), it is possible to provide that the coil element is supported by the winding carrier (e.g., against forces acting radially outward (e.g., in relation to the central rotor axis A), such as centrifugal forces and forces due to fluid pressure). By the firm connection on this outer side, reliable force transmission, where a region of the coil device that is situated radially on the inside (e.g., in relation to the central rotor axis A) may remain free in order, for example, to enable the region to be subjected to a flow of a fluid coolant, is therefore provided.

In one embodiment, the materially bonded connection in the region of the connecting surface between the coil element and the winding carrier is formed by an adhesive. An adhesive connection of this kind is particularly simple to produce and simultaneously allows reliable and firm force-transmitting connection of the two elements described. The adhesive may be a thermally and/or chemically cross-linking adhesive (e.g., an epoxy adhesive). Epoxy adhesives suitable for low temperatures that are also sufficiently solid in cryogenic environments may be used. Examples of cryogenic adhesives are adhesives sold under the names Araldite, Eccobond, Stycast, or Epo-Tek.

The superconducting coil element may include a conductor material that is a high-temperature superconductor. For example, the coil element is wound from a strip conductor that is a high-temperature superconductor. High-temperature superconductors (HTS) are superconducting materials with a transition temperature above 25 K, and in the case of some material classes (e.g., cuprate superconductors), above 77 K, where the operating temperature may be achieved by cooling with cryogenic materials other than liquid helium. HTS materials are also particularly attractive because these materials may have high upper critical magnetic fields and high critical current densities, depending on the choice of operating temperature.

The high-temperature superconductor may, for example, include magnesium diboride or a ceramic oxide superconductor (e.g., a compound of the type $REBa_2Cu_3O_x$ (abbreviation, REBCO)), wherein RE is a rare earth element or a mixture of such elements.

The coil element may be formed by winding up a superconducting strip conductor around the local winding axis a, where the principal surface of the strip conductor is oriented parallel to the local winding axis a. For example, the alignment of the strip conductor may be parallel to the local winding axis a within the entire winding. In this embodiment, the sliding surface may extend parallel to the strip conductor surface. By a relative movement between the coil element and the winding carrier parallel to this strip conductor surface, a reduction in the tensile stresses within the winding is achieved in a particularly effective manner; without this compensation, the tensile stresses may lead to delamination within the layer system of the strip conductor and/or between adjacent turns of the winding.

The rotor may have a plurality of superconducting coil elements that, for example, are of same design to one another. These coil elements may be arranged in a manner distributed over the circumference of the rotor. The individual coil elements in this embodiment may be distributed uniformly over the circumference of the rotor. Such a uniformly distributed arrangement may be provided in order, for example, to produce a symmetrical excitation field for an electric machine.

According to an embodiment, each of these coil elements may be arranged on a separate winding carrier associated therewith. In other words, the structure may be segmented into individual winding carriers for mechanical retention of the individual coil elements. For example, these individual winding carrier segments may be arranged at different positions on the circumference of the rotor. The advantage of such an embodiment includes, for example, the possibility of simpler production of the overall mechanical retaining structure of the coil elements. It is possible, for example, for each of the individual coil elements to be connected separately to the associated winding carrier before these winding carriers are either connected to one another or to an overall retaining structure.

As an alternative to the segmented embodiment described, however, each of the individual coil elements may be arranged on or held by an associated circumferential segment of a common overall winding carrier. In this embodiment, therefore, there is an integral common winding carrier. For example, this winding carrier may have a hollow cylindrical basic shape, where the individual coil elements are embedded into the cylinder jacket in a manner distributed in the circumferential direction. One advantage of such an overall integral winding carrier is that stable mechanical retention is provided without an additional element being required for the retention of the individual segments. An overall winding carrier of this type situated radially on the outside may support the individual coil arrangements both against radial centrifugal forces and also against forces in the circumferential direction without the need for additional holding elements for this purpose.

According to another embodiment, the rotor has at least one interior cavity, in which a fluid coolant may be circulated. Such a coolant may flow, for example, through the cavity in the interior of the rotor to the coil elements, may cool the elements by thermal contact, then flow to a cold head outside the rotor, and then be cooled down again and once again fed into the cavities of the rotor; this overall forms a closed cooling circuit. A cooling system of this kind is particularly effective for cooling the superconducting coil elements to a cryogenic temperature below the transition temperature of the superconductor material used. The interior cavity may be configured such that the at least one coil element may come into thermal contact with the coolant on a side situated radially on the inside (e.g., in relation to the central rotor axis A). On a side situated radially on the inside (e.g., in relation to the central rotor axis A), the coil element is open such that the coil element may come into direct contact with the coolant. Either the superconducting conductor itself or, alternatively, an electric insulation, impregnation and/or, protection layer surrounding the conductor of the coil element may, for example, be in direct contact with the coolant such that the coil element may dissipate the heat generated during operation to the coolant. In other words, the coil element may be at least partially exposed (e.g., not covered by the winding carrier) on a radially inner side; this enables the coil element to be subjected to a flow of the fluid coolant.

The fluid coolant of the rotor may, for example, be hydrogen. Hydrogen is particularly suitable because hydrogen has a sufficiently low boiling point to act as a cryogenic coolant in the liquid state. hydrogen also has a low density, and this has an advantageous effect on the overall weight of the rotor, including the coolant. Such a coolant with a low density is also particularly suitable for enabling rotors for high-speed machines of large diameter to be made available. By virtue of the low-density, the shift in the boiling point caused by the hydrostatic pressure is also small.

As an alternative to the embodiment mentioned with hydrogen, it is also possible to use other liquids or even gases as coolants, however. Other cryogenic coolants that may be used are liquid helium, liquid neon, liquid nitrogen, liquid oxygen, and/or liquid methane. In the use of all these cryogenic coolants, the liquid form may be present together with the gaseous form, and an additional cooling effect may be achieved through evaporation of the liquid in the region of the components to be cooled. Thus, the cryogenic coolant may circulate within the rotor (e.g., according to the thermosiphon principle and/or in the manner of a heat pipe).

The winding carrier may be configured such that when cooled from room temperature to a cryogenic operating temperature of the superconducting coil element, the winding carrier has a higher thermal shrinkage than the coil element as a whole surrounded thereby. When cooled, a precompression of the coil element is thereby achieved, which may already lead to protection from delamination within the coil element and may lead to better mechanical retention of the coil element in the winding carrier without the need for a materially bonded connection in the region of the entire contact surface.

According to an embodiment, the material of the winding carrier includes aluminum and/or magnesium. For example, the winding carrier may consist primarily of one of the two metals mentioned or alternatively of an alloy with at least one of the two metals. In such an alloy, aluminum and/or magnesium may be present either as the main component or as a secondary component. Irrespective of the precise configuration, it is the case that the use of aluminum and/or magnesium in the material of the winding carrier makes it possible to achieve a relatively high thermal expansion coefficient and thus relatively high shrinkage of the winding carrier onto the coil element.

According to another embodiment, the proportion of the total contact surface accounted for by the connecting surface (e.g., the first partial region) is no more than 80%. In one embodiment, the proportion of the total contact surface accounted for by the connecting surface may be 70% or less. With such a limitation of the materially bonded region, there is a comparatively high proportion accounted for by the second partial region, in which a non-destructive relative movement between the coil element and the winding carrier (and thus stress compensation) is made possible. The effect of the stress reduction is then pronounced.

The electric machine with the rotor according to the present embodiments may be configured for a power density of at least 5 kW/kg, and the electric machines may be configured for a power density of at least 10 kW/kg. In the case of a machine with such a high power density, the described advantages of the rotor are particularly significant. Machines with such high power densities are a basic prerequisite for fully electrically powered airplanes. However, such machines are also advantageous in the area of other applications, such as other mobile applications. The power density mentioned may be the rated power of the machine relative to overall weight of the machine (e.g., relative to the weight of the stator, rotor, housing, cooling system plus any components that may also be present).

The machine or rotor may be configured for a rated power of at least 5 MW (e.g., at least 10 MW). With such a high power, the machine is fundamentally suitable for driving a vehicle (e.g., an airplane). As an alternative, however, it is also possible with such a powerful machine to produce the electric power required for driving on board the vehicle if the machine is operated as a generator. In principle, the machine may be embodied either as a motor or as a generator or may optionally be configured for both modes of operation. In order to achieve the high powers and/or power densities described, coil elements that are high-temperature superconductors are particularly suitable since such coil elements allow particularly high current densities.

The machine or rotor may be configured for a rotor speed of at least 1000 revolutions per minute (e.g., even for at least 3000 revolutions per minute). Using the described embodiment of the rotor with a relatively low density, such high speeds may be achieved particularly well. Assuming a size required for the power ranges mentioned, it is not possible to achieve the power ranges at all in some cases with conventional rotors. It may not even be possible under some circumstances to achieve the power densities that are advantageous for the applications described with relatively low-speed machines.

According to an embodiment of the production method, the pre-produced coil element may be configured as a wet-wound coil element. In other words, in the production of the winding, an impregnating agent (e.g., an impregnating resin) may be applied between the turns of the winding and then cured. To produce the materially bonded connection between the coil element and the winding carrier, it is possible to choose the same material as the impregnating agent or, alternatively, a different material. The possibility of using a dry-wound coil in a rotor according to the present embodiments should not, however, be excluded either. For example, a dry-wound coil may be encapsulated with a casting material following the production of the winding, thereby likewise forming an inherently stable (e.g., self-supporting) coil element.

DETAILED DESCRIPTION

In the figures, elements that are the same or have a same effect are provided with the same reference signs.

Figure 1:
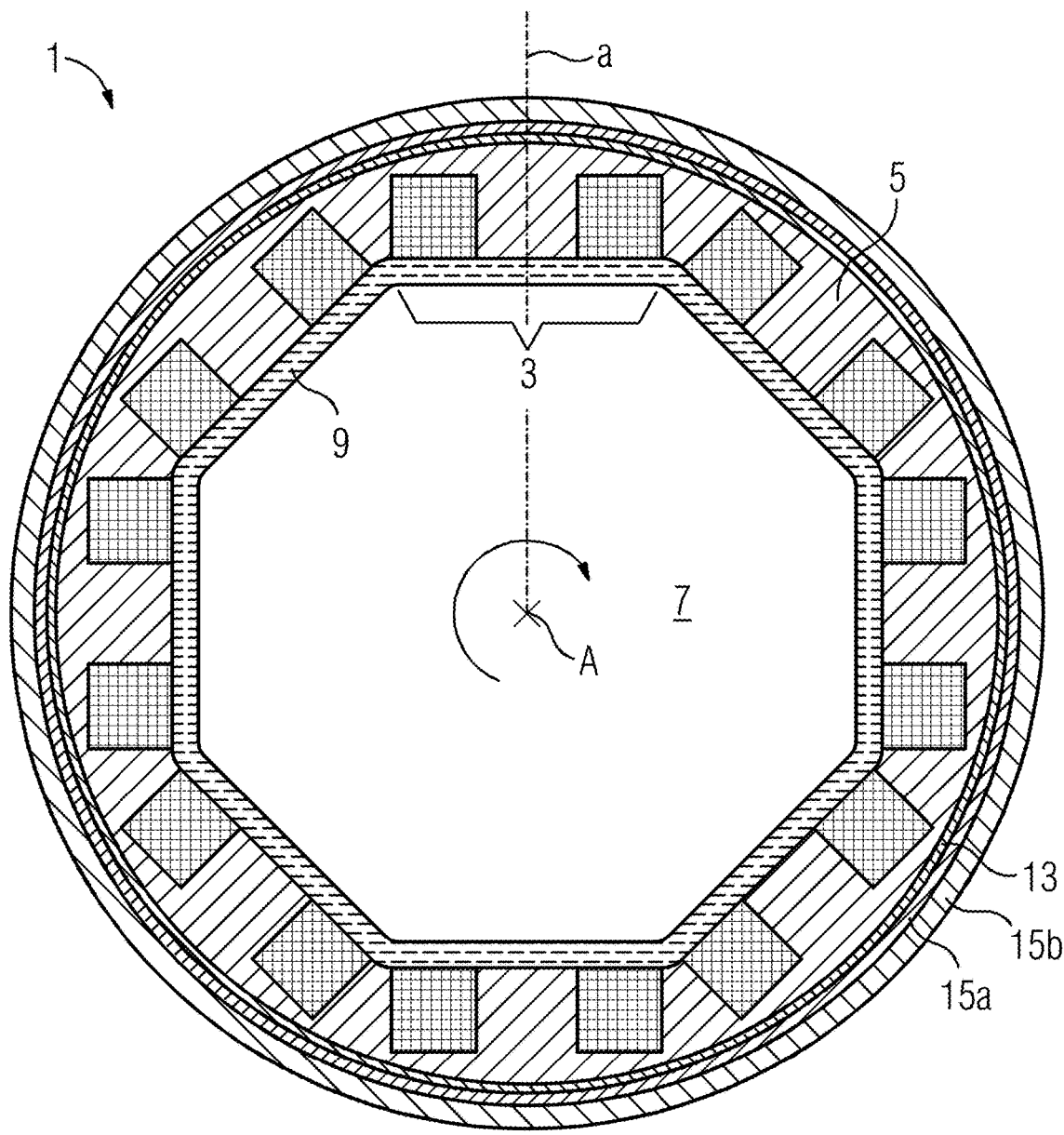
FIG. 1 shows a schematic cross-sectional illustration of a rotor according to a first example.

FIG. 1 shows a schematic cross-sectional illustration of a rotor 1 according to a first example. FIG. 1 shows a section perpendicular to a central rotor axis A about which the rotor 1 is rotatably mounted. In this example, the rotor 1 has eight superconducting coil elements 3 that together form an overall rotor winding. Each of the eight coil segments has a respective local axis of symmetry (e.g., a local winding axis a, of which only one is shown, by way of example, in FIG. 1). Overall, the rotor winding is configured to produce an eight-pole electromagnetic field. In this example, the individual coil elements 3 are held mechanically by a common hollow cylindrical winding carrier 5. The winding carrier 5 supports all eight coil elements 3 from a side situated radially on the outside in relation to the central axis A. On a side of the coil elements 3 that is situated radially on the inside in relation to A, the coil elements 3 adjoin a cavity 7 and are subjected from here to a flow of a fluid coolant 9 and thereby cooled to a cryogenic temperature. At a sufficiently high speed of rotation, the liquid coolant is distributed over a circumference of the rotor 1 by rotation of the rotor 1, indicated by the arrow, as shown schematically by an annular liquid level.

In order to facilitate the cooling of the superconducting coil elements 3 to a cryogenic operating temperature, the winding carrier 5 is surrounded by a double-walled cryostat. In FIG. 1, the double-walled cryostat is represented by an inner cryostat wall 15a in the form of a cylinder jacket and an outer cryostat wall 15b, likewise in the form of a cylinder jacket (e.g., two cryostat walls 15a, 15b). An annular vacuum space is formed between the two cryostat walls 15a, 15b, and therefore, the winding carrier 5 and the other components situated radially further in are thermally insulated from the external environment. Within the two cryostat walls 15a, 15b, an optional binding 13 is also wound around the winding carrier 5 in order to give additional mechanical support to the winding carrier 5.

Figure 2:
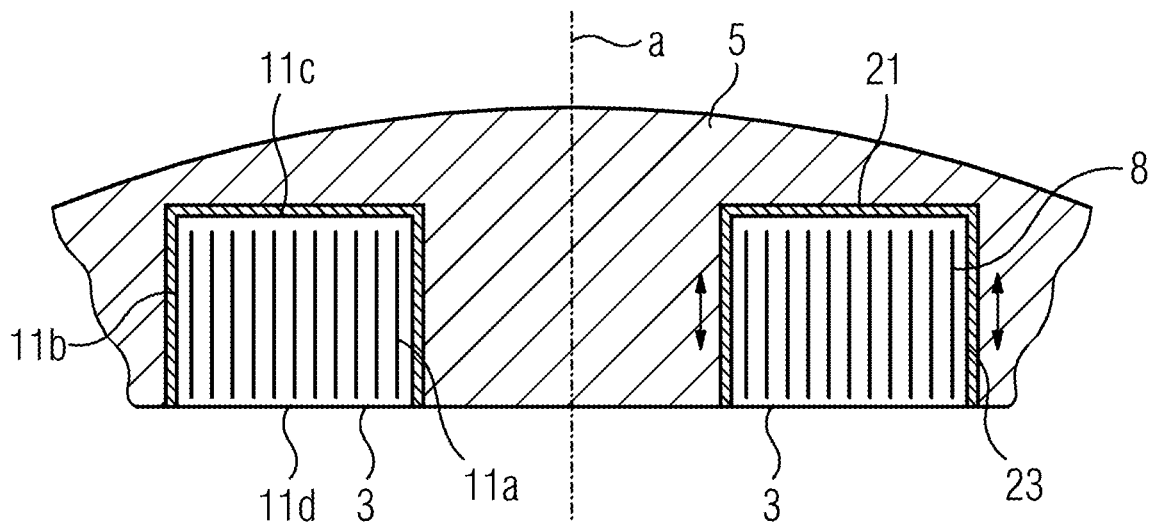
FIG. 2 shows a schematic partial view of the cross section from FIG. 1.

FIG. 2 shows a schematic partial view of the cross section of the rotor 1 from FIG. 1. A detail of the winding, which corresponds to one magnetic pole, is shown in FIG. 2. FIG. 2 illustrates an azimuthal detail view of the hollow cylindrical winding carrier, which carries one of the total of eight coil elements 3. The coil element 3 is a coil arrangement in the form of a continuous ring, of which both coil sides is shown in the cross-sectional illustration of FIG. 2. These coil sides each have a rectangular cross-sectional shape. FIG. 2 illustrates more precisely how the coil element 3 is supported mechanically by the winding carrier 5 and via which contact surfaces the coil element 3 is embedded in the winding carrier 5. The rectangular cross-sectional shape of the coil element 3 defines four principal surfaces of the coil element 3, which run round in the form of a ring: a first coil surface 11a that is situated radially on the outside in relation to the central rotor axis A; a second coil surface 11b that is situated radially on the outside in relation to the local winding axis a of the coil element 3; a third coil surface 11c that is situated radially on the inside in relation to the local winding axis a of the coil element; and a fourth coil surface 11d that is situated radially on the inside in relation to the central rotor axis A.

In the example shown, the coil element 3 is embedded into the winding carrier 5 such that an overall contact surface that is composed of the three coil surfaces 11a, 11b and 11c is obtained. In the region of the fourth coil surface 11d, the coil element lies exposed and may be subjected from there to a flow of a fluid coolant 9. On the remaining three coil surfaces, the coil element 3 is embedded so firmly into the winding carrier 5 that the rotor 1 as a whole may withstand even the forces that occur at high machine powers and high speeds of rotation. In order to create a firm and, for example, irreversible connection between the winding carrier 5 and the coil element 3 in this case, the coil element 3 is connected by material bonding to the winding carrier 5 in the region of the third coil surface 11c by an adhesive 21. This is a matter of a connecting surface that makes up only a partial region of the overall contact surface between the coil element and the winding carrier. In contrast to this surface firmly bonded by adhesion, there is, for example, no adhesive bond on the two lateral peripheral surfaces 11a and 11b. Instead, the winding carrier 5 is coated with an antifriction layer 23 composed of Teflon in the region of these two lateral peripheral surfaces 11a and 11b. Omitting the adhesive in these regions of the contact surface provides that a relative movement is made possible between, for example, the coil element 3 and the winding carrier 5, as indicated by the two double arrows. This sliding movement is further facilitated by the embodiment shown with the optional antifriction layer 23. The direction of the sliding movement may be parallel to the direction of the local winding axis a of the coil element 3. In the example shown, the coil element 3 is wound as a simple cylindrical flat coil consisting of a superconducting strip conductor 8. In this case, the turns of the strip conductor 8 rest flat one above the other, such that the principal surface of the strip conductor 8 is aligned parallel to the local winding axis a in all parts of the annular winding. Thus, the direction of the sliding movement described is also parallel to the principal surfaces of the strip conductor 8 (e.g., in the direction that is in the direction of the width of the conductor). A relative movement between the coil element 3 and the winding carrier 5 brings about the advantage that local stresses, which may otherwise lead to delamination within the strip conductor 8 and/or between the individual layers of the winding, are dissipated during this process.

The winding carrier 5 may be formed from a material that is subject to greater thermal shrinkage during cooling than the coil element 3 as a whole. A precompression is thereby achieved when the operating temperature of the rotor 1 is reached, and, as a result, there is also a nonpositive connection between the coil element 3 and the winding carrier 5 on the two lateral surfaces 11a and 11b that are not attached by an adhesive.

Figure 3:
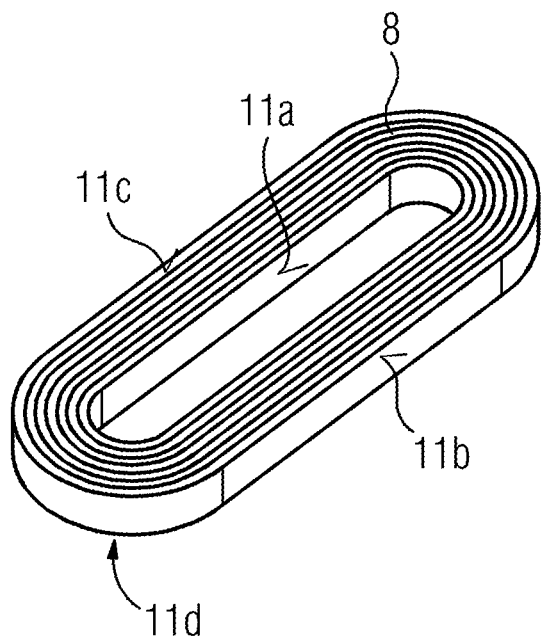
FIG. 3 shows a schematic perspective illustration of one embodiment of a coil element.

FIG. 3 shows a schematic perspective illustration of an individual coil element 3 of the kind that may be used in the rotor 1 of FIGS. 1 and 2, for example. Here, the coil element 3 is configured as a cylindrical flat coil that has been produced by winding a plurality of turns of a superconducting strip conductor 8 around the local coil axis a. The coil element 3 has the geometry of a right cylinder, where the basic shape of the cylinder is an oval shape similar to a racetrack.

Figure 4:
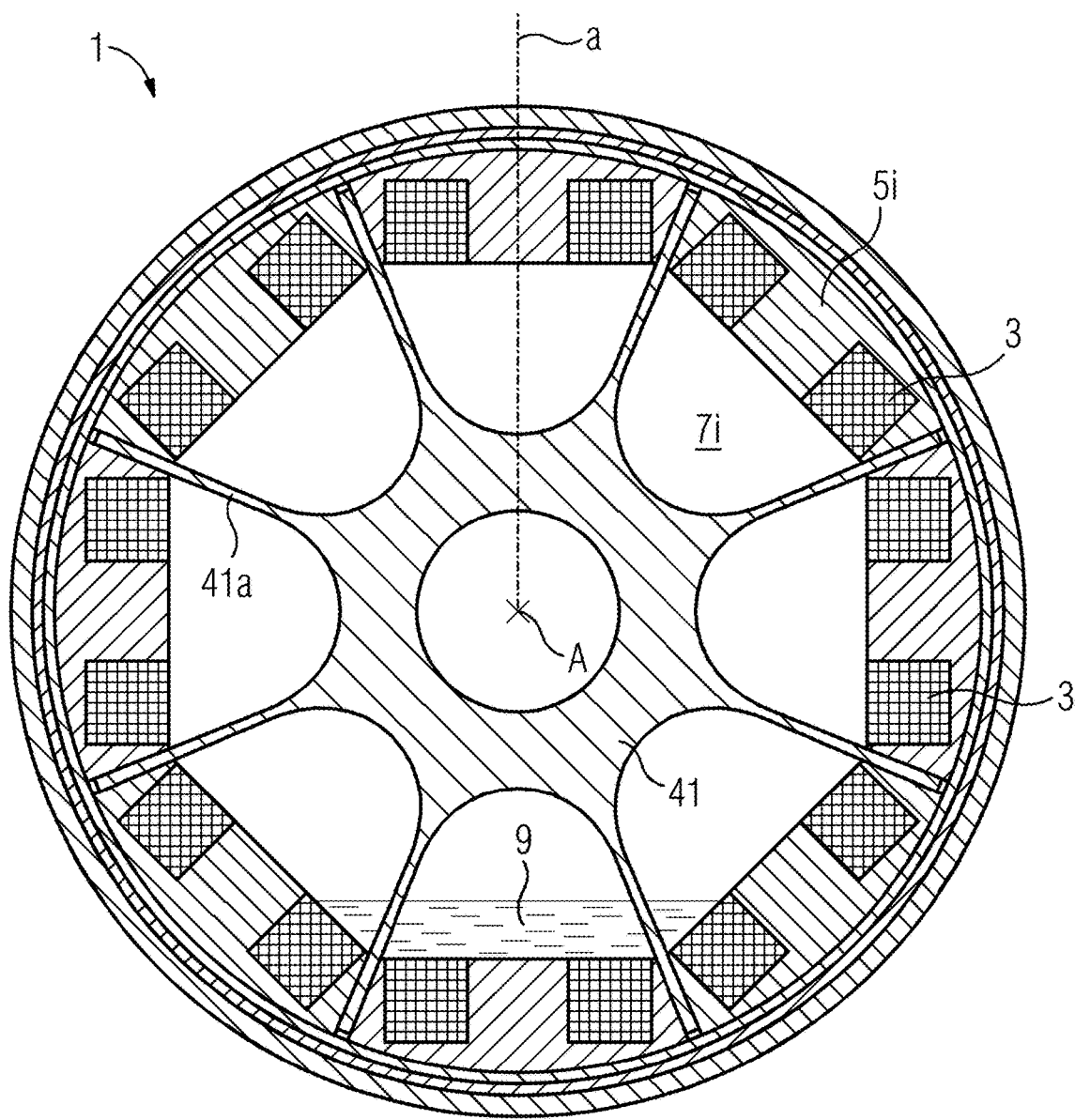
FIG. 4 shows a schematic cross-sectional illustration of a rotor according to a second example.

FIG. 4 shows a schematic cross-sectional illustration of a rotor 1 according to a second exemplary embodiment. In contrast to the example in FIG. 1, the winding carrier 5 is not formed by an integral overall cylinder jacket but is composed of eight separate circumferential segments 5i. Another difference is that the winding carrier 5 as a whole is not of self-supporting design but is held by a skeleton-type supporting structure 41 situated radially on an inside and having a plurality of struts 41a. Here, the embedding of the individual coil elements 3 into the respective segments 5i of the winding carrier 5 and, for example, the embodiment of the individual regions of the contact surface may, in principle, be configured analogously to the example in FIG. 2.

Figure 5:
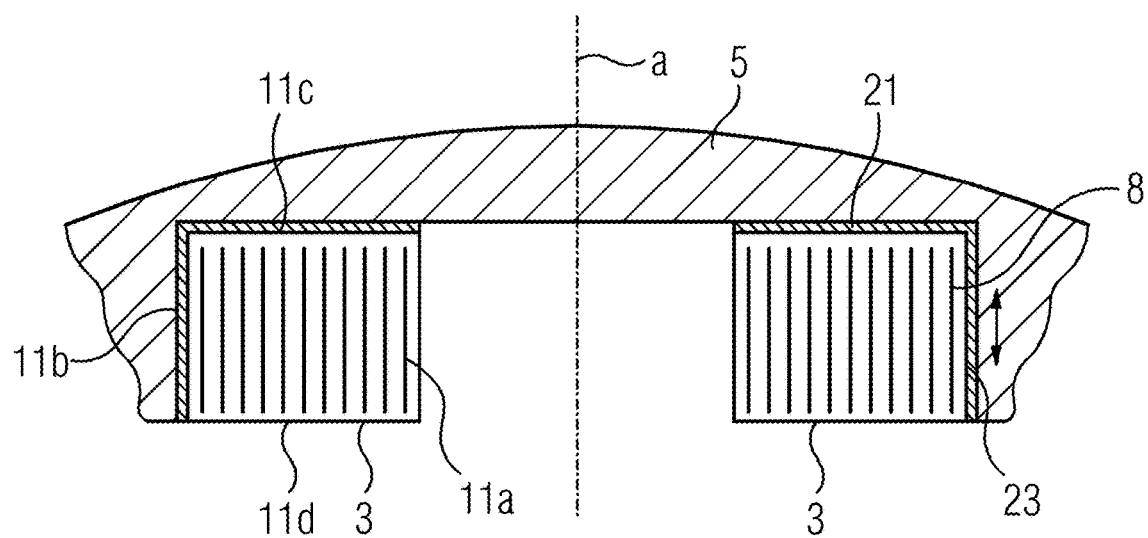
FIG. 5 shows a schematic partial view of the cross section of a rotor according to a third example.

FIG. 5 shows a schematic partial view of a cross section of a rotor according to a third example. Once again, an azimuthal detail view of a winding carrier 5, in which a coil element 3 is embedded, is shown. In this case, it is possible, in principle, for the embodiment of the overall winding carrier 5 either to be similar to that in FIG. 1 (e.g., as a continuous hollow cylinder) or similar to that in FIG. 4 (e.g., being composed of separate segments 5i). In the context of the third exemplary embodiment, the coil element 3 is embedded into the winding carrier 5 via only two principal surfaces of the coil element 3. In this example, the second principal surface 11b, which is situated radially on the outside in relation to the local winding axis a, and the third principal surface 11c, which is situated radially on the outside in relation to the central rotor axis A), jointly form the contact surface between the coil element 3 and the winding carrier 5. Here too, the connecting surface connected by an adhesive 21 does not extend over the entire contact surface but only over a partial region thereof. In the example shown, the connecting surface is formed by the third coil surface 11c and a small partial region (e.g., situated radially on the outside in relation to the central rotor axis A) at the edge of the second coil surface 11b. Here too, however, the main part of the second coil surface 11b forms a sliding surface, within which the coil element 3 and the winding carrier 5 may be moved relative to one another, parallel to the local winding axis a. In the region of the remaining two coil surfaces 11a and 11d, the coil element 3 in this exemplary embodiment lies exposed and may thus be subjected to a flow of a coolant on these two sides. The embedding on two sides and the limited fixing by the adhesive 21, which extends over only part of the contact surface, is sufficient to support the coil element 3 firmly against the winding carrier 5 during the operation of the rotor. Here too, shrinking onto the coil element 3 during cooling to the operating temperature may be achieved by a suitable choice of material for the winding carrier 5. In this example too, that part of the contact surface that is not connected by the adhesive 21 is likewise provided with an antifriction layer 23 on the winding carrier 5.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A rotor for an electric machine with a central rotor axis, the rotor comprising:
   at least one superconducting coil element with a local winding axis; and
   at least one winding carrier, into which the at least one superconducting coil element is embedded,
   wherein a materially bonded connection is formed between a winding carrier of the at least one winding carrier and a coil element of the at least one superconducting coil element, and
   wherein the materially bonded connection is present on a connecting surface that forms only a first partial region of an entire contact surface between the coil element and the winding carrier,
   wherein a sliding surface is formed as a second partial region of the entire contact surface between the coil element and the winding carrier, such that in the second partial region of the entire contact surface between the coil element and the winding carrier, the coil element and the winding carrier are in mechanical contact and the coil element is slidable relative to the winding carrier.

2. The rotor of claim 1, wherein the sliding surface is formed at least partially by a surface that is oriented parallel to the local winding axis of the coil element.

3. The rotor of claim 1, wherein the sliding surface is provided at least partially by a first coil surface that is oriented radially inward in relation to the local winding axis of the coil element, a second coil surface that is oriented radially outward in relation to the local winding axis of the coil element, or a combination thereof.

4. The rotor of claim 1, wherein the coil element, the winding carrier, or the coil element and the winding carrier are coated with a lubricant in a region of the sliding surface.

5. The rotor of claim 1, wherein a nonpositive contact is formed between the coil element and the winding carrier in a region of the sliding surface.

6. The rotor of claim 1, wherein the connecting surface comprises a third coil surface that is directed radially outward in relation to the central rotor axis.

7. The rotor of claim 1, wherein the materially bonded connection in a region of the connecting surface is formed by an adhesive.

8. The rotor of claim 1, wherein the at least one superconducting coil element comprises a conductor material that is a high-temperature superconductor.

9. The rotor of claim 1, wherein the at least one superconducting coil element is formed by a wound up superconducting strip conductor around the local winding axis, and
wherein a principal surface of the strip conductor is oriented parallel to the local winding axis.

10. The rotor of claim 1, wherein the at least one superconducting coil element comprises a plurality of superconducting coil elements that are arranged in a manner distributed over a circumference of the rotor, and
wherein each coil element of the plurality of superconducting coil elements is arranged on a separate winding carrier associated therewith.

11. The rotor of claim 1, wherein the at least one superconducting coil element comprises a plurality of superconducting coil elements that are distributed over the circumference of the rotor, and
wherein each coil element of the plurality of superconducting coil elements is arranged on an associated circumferential segment of a common overall winding carrier.

12. The rotor of claim 1, wherein the rotor has at least one interior cavity, in which a fluid coolant is circulatable.

13. An electric machine comprising:
a rotor with a central rotor axis, the rotor comprising:
at least one superconducting coil element with a local winding axis; and
at least one winding carrier, into which the at least one superconducting coil element is embedded, wherein a materially bonded connection is formed between a winding carrier of the at least one winding carrier and a coil element of the at least one superconducting coil element, and wherein the materially bonded connection is present on a connecting surface that forms only a first partial region of an entire contact surface between the coil element and the winding carrier; and
a stator arranged in a fixed manner,
wherein a sliding surface is formed as a second partial region of the entire contact surface between the coil element and the winding carrier, such that in the second partial region of the entire contact surface between the coil element and the winding carrier, the coil element and the winding carrier are in mechanical contact and the coil element is slidable relative to the winding carrier.

14. A method for producing a rotor, the method comprising:
producing a coil element that is inherently stable as a pre-produced component;
subsequently inserting the coil element into a winding carrier; and
producing a materially bonded connection between the coil element and the winding carrier on a connecting surface that forms only a first partial region of a contact surface between the coil element and the winding carrier,
wherein a sliding surface is formed as a second partial region of the contact surface between the coil element and the winding carrier, such that in the second partial region of the entire contact surface between the coil element and the winding carrier, the coil element and the winding carrier are in mechanical contact and the coil element is slidable relative to the winding carrier.

15. The electric machine of claim 13, wherein the sliding surface is formed at least partially by a surface that is oriented parallel to the local winding axis of the coil element.

16. The electric machine of claim 13, wherein the sliding surface is provided at least partially by a first coil surface that is oriented radially inward in relation to the local winding axis of the coil element, a second coil surface that is oriented radially outward in relation to the local winding axis of the coil element, or a combination thereof.

17. The electric machine of claim 13, wherein the coil element, the winding carrier, or the coil element and the winding carrier are coated with a lubricant in a region of the sliding surface.

* * * * *